June 26, 1928.
J. FRASER, JR
1,675,172
VALVE
Filed Jan. 25, 1926
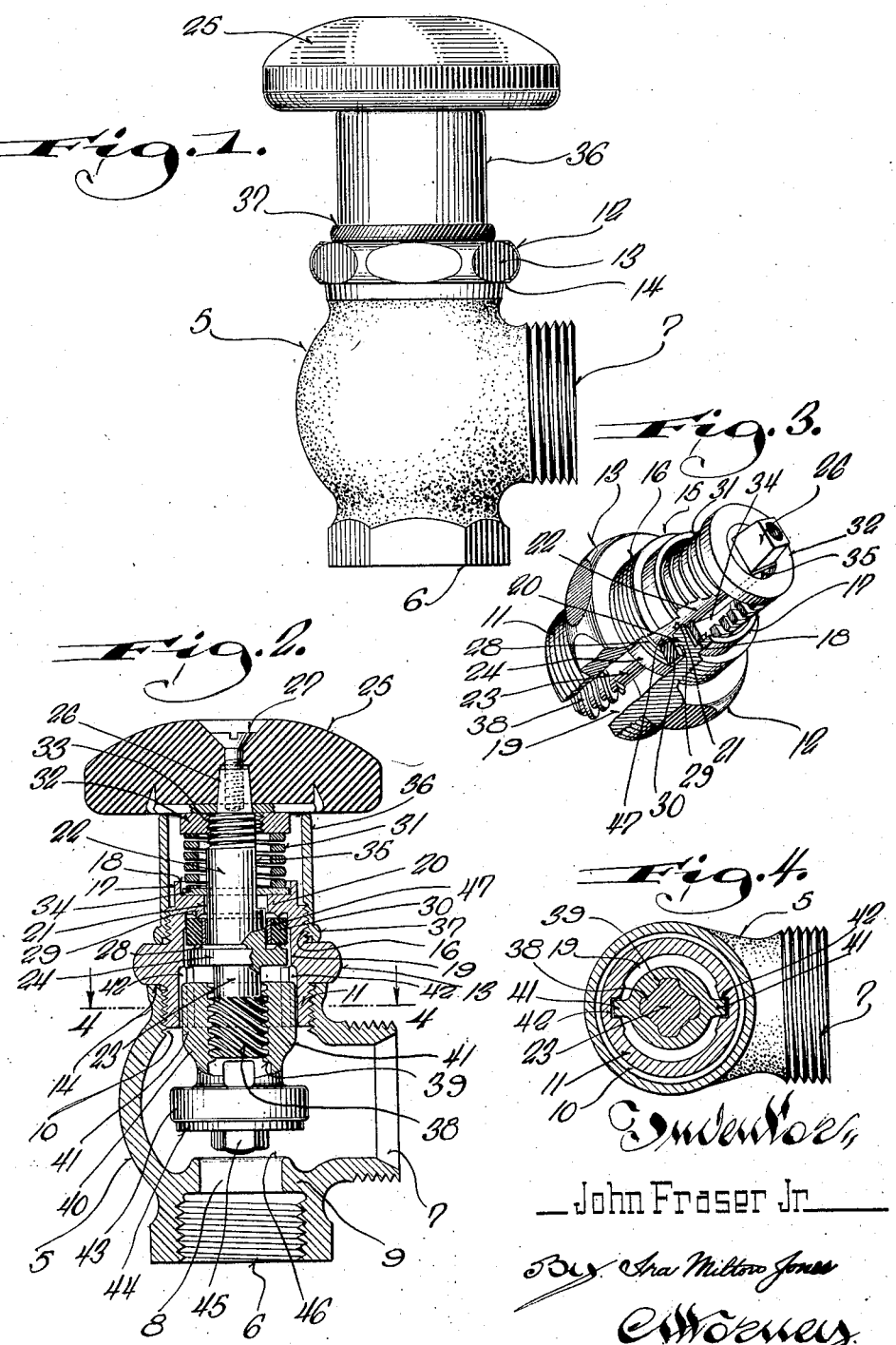
Inventor,
John Fraser Jr
By Ara Milton Jones
Attorney Patented June 26, 1928.

1,675,172

UNITED STATES PATENT OFFICE.

JOHN FRASER, JR., OF MILWAUKEE, WISCONSIN, ASSIGNOR TO MILWAUKEE VALVE COMPANY, OF MILWAUKEE, WISCONSIN, A CORPORATION OF WISCONSIN.

VALVE.

Application filed January 25, 1926. Serial No. 83,582.

One objectionable feature of valves of the packless type is that an undue amount of friction caused by the spring for maintaining the stem disc in fluid tight engagement with its cooperating parts must be overcome to operate the valve and this invention has as one of its objects the provision of an improved valve structure wherein the friction is reduced to a minimum and the opening and closing of the valve materially facilitated.

Another object of this invention resides in the provision of an improved packless valve construction wherein the entire packless valve unit turns with the valve stem thereby greatly facilitating the manipulation of the valve.

It has been found from experience that the disc taking the place of the valve stem packing has a high coefficient of expansion under temperature changes and as a result frequently becomes bound on the valve stem adding to the friction opposing the opening and closing of the valve and this invention contemplates as a further object the provision of an improved disc having a metallic sleeve member molded therein to receive the valve stem and guard against binding of the disc thereon.

An a still further object of this invention resides in the provision of an improved valve of the character described which is of simplified construction and capable of being readily opened and closed with a minimum effort.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side elevational view of a valve structure embodying my invention;

Figure 2 is a sectional view through the valve taken on a substantially vertical plane;

Figure 3 is a perspective view, parts being broken away and in section, of the packless unit detached from the valve casing, and Figure 4 is a view taken transversely through Figure 2 on the plane of the line 4—4.

Referring now more particularly to the accompanying drawing, in which like numerals designate like parts throughout the several views, the numeral 5 designates a valve casing having an inlet 6 and an outlet 7 adapted to be connected through the valve port 8 of a partition 9 interposed between the inlet and outlet. The wall or end of the casing 5 opposite the partition 9 has an internally threaded opening 10 in axial alignment with the valve port in which is threaded the boss 11 of a cap member 12 provided with a medial flange 13 adapted to have a snug engagement with the peripheral portion 14 of the valve casing surrounding the opening 10 to provide a fluid tight joint.

The cap 12 has a boss 15 on its upper end, the lowermost portion 16 of which is externally threaded for the purpose hereinafter described and the outer end 17 of which is turned down to provide a reduced portion provided with a counter-bore or recess 18. The recess 18 is comparatively shallow and is separated from a bore 19, extending throughout substantially the entire length of the cap and communicating with the interior of the valve casing, by a partition wall 20 having an aperture 21 therein to slidably receive the upper shank portion 22 of a valve stem 23.

The valve stem has a flange 24 on its medial portion located within the bore 19 below the partition wall 20 and extends upwardly through the aperture 21 to receive an operating handle or wheel 25 which is fixed to the outer squared end 26 thereof by a screw 27. The flange 24 has an annular bead 28 on its uppermost surface which co-operates with a similar bead 29 on the inner surface of the partition wall 20 to engage the opposite surfaces of a disc 30 to make a fluid tight joint therebetween. An expansile spring 31 surrounds that portion of the valve stem shank externally of the cap 12 and is maintained under compression between a nut 32 engaged on the threaded portion 33 of the shank adjacent its squared end 26 and a washer 34 surrounding the valve stem and seated within recess 18 to provide the compression necessary to keep the disc 30 in fluid tight connection with the beads 28 and 29. That portion of the valve stem projecting externally of the wall 20 has one side milled, as at 35, to provide a flat surface to lock the washer 34 thereto for rotation therewith, the recess 18 maintaining the lower end of the spring 31 properly centered with respect to the shank.

The nut 32, spring 31 and upper portion of cap 12 are enclosed by a cylindrical sleeve or collar 36 having its lower end internally threaded for engagement over the threaded boss 16 as illustrated in Figure 2, thus giving the valve a neat exterior appearance, the sleeve 36 having a knurled bead 37 on its lower portion to facilitate its removal from or attachment to the cap.

The lower portion of the valve stem below the flange 24 preferably projects outwardly of the bore 19 and has an enlargement 38 on its lowermost end having acme threads thereon to form a worm for threaded engagement in the bore 39 of a guide boss or sleeve 40 slidable in the bore 19 but held from rotation with respect thereto by wing members 41 slidable in guide ways 42 communicating with the bore 19. Carried by the lower end of the boss 40 is a cup shaped retainer 43 in which a renewable valve disc 44 is securable by a nut and stud 45, the valve disc being engageable with a valve seat 46 surrounding the port 8.

The threads of the worm or enlargement on the lower end of the valve stem are such that rotation of the valve stem by the handle or wheel 25 through approximately three hundred and sixty degrees moves the valve disc throughout its full limit of movement, the member 40 being moved vertically to and from its seat as the valve stem is rotated by reason of its slidable but non-rotatable connection in the bore 19 of the cap.

The objectionable feature of packless valves has been primarily the effort required to open and close the same due to the friction of the spring for maintaining the stem disc in engagement with its seat and the structure described above and shown in the accompanying drawing overcomes this objection as the entire packless unit turns as one with the stem and the only point of frictional contact is between the washer 34 and the top of the wall 20. The friction between the washer 34 and wall 20 is reduced to a minimum by the application of a suitable lubricant as will be readily apparent.

The discs 30 have further increased the difficulty of opening and closing of the valve since being of material having a high coefficient of expansion, they frequently become bound on the valve stems. The novel type of disc illustrated in the drawing in which the metallic sleeve 47 is molded at its time of formation eliminates this objection as the sleeve prevents expansion of the disc towards the stem. With this construction the disc 30 is at all times free on the valve stem as will be readily apparent.

The sleeve 36 in addition to enclosing the spring and valve stem, serves as a guard against unseating of the disc 30 by pressure on the operating wheel as will be apparent.

What I claim as my invention is:

1. In a packless valve including a body having an aperture in one wall, a valve stem passed through the body aperture, a flange on the valve stem, a disc interposed between the apertured wall and flange, means at all times urging the flange towards said wall to provide a fluid tight joint with the disc, means whereby the flange and its urging means turn as a unit with the stem, lubricant receiving means surrounding the valve stem at its point of egress through said aperture, and a sleeve member enclosing the urging and lubricant receiving means.

2. In a packless valve including a valve part having an apertured wall, a valve stem passed through the aperture, a flange on the inner portion of the stem, a disc disposed between the flange and the inner face of the wall, a spring on the other side of the wall at all times urging the flange towards the wall to provide a fluid tight joint with the disc, a washer member interposed between the spring and the upper face of the wall and turning with the valve stem, whereby the valve stem, spring, washer member and flange turn as a unit to reduce friction, a well surrounding the aperture on the outer face of the valve part in which the washer member and the inner end of the spring are disposed, and means enclosing the spring, washer member and that portion of the valve stem extending above the valve part.

3. In a packless valve including a body member having an inlet and an outlet, a valve seat surrounding a valve port in the body member between the inlet and outlet, a cap member threaded into the body member in axial alignment with the valve seat and having an aperture extending centrally therethrough, a valve stem passed through the aperture, a flange fixed on the inner portion of the valve stem, a disc disposed between the flange and the inner face of the cap member, spring means at all times urging the valve stem outwardly to compress the disc between the cap member and flange to form a fluid tight joint with the disc, a washer member interposed between the spring and the upper face of the body member, valve actuating means carried by the outer end of the valve stem, a valve member within the body member, means operatively connecting the valve member and valve stem, whereby rotation of the valve stem engages and disengages the valve member and seat, means whereby the spring, washer member, flange and valve actuating means turn as a unit, the upper portion of the cap member being externally threaded and its top face recessed to receive the washer member and inner end of the spring to provide a lubricant receiving well, and a sleeve threaded on the cap member and enclosing the exterior portion of the valve stem and spring means and cooperating with actuating means to prevent the inward movement of the valve against the spring means by the application of the pressure on the actuating means.

In testimony whereof I affix my signature.

JOHN FRASER, Jr.